(12) United States Patent
Ji et al.

(10) Patent No.: US 11,249,712 B2
(45) Date of Patent: Feb. 15, 2022

(54) DISPLAY SYSTEM, TRANSMISSION DEVICE AND RELAY DEVICE

(71) Applicant: LG DISPLAY CO., LTD., Seoul (KR)

(72) Inventors: Hyun-Jong Ji, Paju-si (KR); Takayuki Suzuki, Tokyo (JP); Katsuyoshi Hiraki, Tokyo (JP)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/117,569

(22) Filed: Dec. 10, 2020

(65) Prior Publication Data

US 2021/0182010 A1    Jun. 17, 2021

(30) Foreign Application Priority Data

Dec. 17, 2019 (JP) .............................. JP2019-227055

(51) Int. Cl.
*G06F 3/14* (2006.01)
*H04B 3/36* (2006.01)
*G09G 3/3275* (2016.01)

(52) U.S. Cl.
CPC ......... *G06F 3/1423* (2013.01); *G09G 3/3275* (2013.01); *H04B 3/36* (2013.01); *G09G 2370/02* (2013.01)

(58) Field of Classification Search
CPC ............ G06F 3/14; G09G 3/3275; H04B 3/36
See application file for complete search history.

(56) References Cited

U.S. PATENT DOCUMENTS

2002/0129374 A1* 9/2002 Freeman ............ H04N 21/4331
725/91
2004/0233125 A1* 11/2004 Tanghe ................. G06F 3/1446
345/1.3

(Continued)

FOREIGN PATENT DOCUMENTS

JP    2005-274937 A    10/2005
JP    2009-182821 A    8/2009

(Continued)

OTHER PUBLICATIONS

Korean Office Action dated Jul. 27, 2021, issued in corresponding Korean Patent Application No. 10-2020-0088951 Note: KR 2009-182821 cited therein is already of record.

*Primary Examiner* — Shaheda A Abdin
(74) *Attorney, Agent, or Firm* — Morgan, Lewis & Bockius LLP (57) ABSTRACT

A display system includes: first to $N^{th}$ (N is an integer greater than or equal to 2) display panels; a drive part configured to output first to $N^{th}$ video signals of a video to be respectively displayed on the first to $N^{th}$ display panels and first to $N^{th}$ control signals for respectively controlling the first to $N^{th}$ display panels; and a transmission part configured to transmit the first to $N^{th}$ video signals and the first to $N^{th}$ control signals to the first to $N^{th}$ display panels, wherein the transmission part includes first to $N^{th}$ relay parts, and the $m^{th}$ (m is an integer satisfying $1 \leq m \leq N-1$) relay part outputs the $m^{th}$ video signal to the $m^{th}$ display panel and outputs the $(m+1)^{th}$ to $N^{th}$ video signals to the $(m+1)^{th}$ relay part.

21 Claims, 5 Drawing Sheets

(56) References Cited

U.S. PATENT DOCUMENTS

2006/0158560 A1    7/2006   Jung
2012/0127145 A1    5/2012   Jang et al.
2014/0254638 A1*   9/2014   Maeda .................... H04B 3/36
                                                                                      375/211

FOREIGN PATENT DOCUMENTS

| KR | 10-2006-0083301 A | 7/2006 |
| KR | 10-2012-0054442 A | 5/2012 |
| KR | 10-2019-0093259 A | 8/2019 |

\* cited by examiner

DISPLAY SYSTEM, TRANSMISSION DEVICE AND RELAY DEVICE

CROSS REFERENCE TO RELATED APPLICATIONS

The present application claims the priority benefit of Japanese Patent Application No. 2019-227055 filed in the Japan Patent Office on Dec. 17, 2019, which is hereby incorporated by reference in its entirety for all purposes as if fully set forth herein.

BACKGROUND

Technical Field

The present disclosure relates to a display system, a transmission device and a relay device.

Discussion of the Related Art

Japanese Patent Application Publication No. 2005-274937 discloses a multi-screen video playback device which has a function of providing display device control information for controlling a plurality of display devices constituting a multi-screen display to the plurality of display devices. The device disclosed in Japanese Patent Application Publication No. 2005-274937 employs a local area network (LAN) as a network for transmitting display device control information to a plurality of lithography units.

Also, Japanese Patent Application Publication No. 2009-182821 discloses a video signal transmission system for transmitting a video signal sent from a host computer to a plurality of displays. In the system disclosed in Japanese Patent Application Publication No. 2009-182821, a relay unit is installed to convert an optical signal sent from a transmission unit, which converts a video signal into an optical signal, into a video signal and to input the video signal to each of a plurality of displays.

However, in the device disclosed in Japanese Patent Application Publication No. 2005-274937, a transmitter/receiver is installed to transmit display device control information, which is generated as display device control packets, to a lithography unit and to receive information transmitted from the lithography unit using a LAN. Also, in the system disclosed in Japanese Patent Application Publication No. 2009-182821, a photoelectric converter is installed in the relay unit to convert an optical signal into a video signal. Due to the transmitter/receiver or the photoelectric converter, a configuration for transmitting a signal to a plurality of displays is complicated in the device or system disclosed in Japanese Patent Application Publication No. 2005-274937 or 2009-182821.

SUMMARY

Accordingly, embodiments of the present disclosure are directed to a display system, a transmission device, and a relay device that substantially obviate one or more of the problems due to limitations and disadvantages of the related art.

An aspect of the present disclosure is to provide a display system, a transmission device, and a relay device with which a signal is transmitted to a plurality of display panels through a simple configuration Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display system comprises: first to $N^{th}$ (N is an integer greater than or equal to 2) display panels; a drive part configured to output first to $N^{th}$ video signals of a video to be respectively displayed on the first to $N^{th}$ display panels and first to $N^{th}$ control signals for respectively controlling the first to $N^{th}$ display panels; and a transmission part configured to transmit the first to $N^{th}$ video signals and the first to $N^{th}$ control signals to the first to $N^{th}$ display panels, wherein the transmission part includes first to $N^{th}$ relay parts, and the $m^{th}$ (m is an integer satisfying $1 \leq m \leq N-1$) relay part outputs the $m^{th}$ video signal to the $m^{th}$ display panel and outputs the $(m+1)^{th}$ to $N^{th}$ video signals to the $(m+1)^{th}$ relay part.

In another aspect, a transmission device in a display system, which includes first to $N^{th}$ (N is an integer greater than or equal to 2) display panels and a drive part configured to output first to $N^{th}$ video signals of a video to be respectively displayed on the first to $N^{th}$ display panels and first to $N^{th}$ control signals for respectively controlling the first to $N^{th}$ display panels, transmits the first to $N^{th}$ video signals and the first to $N^{th}$ control signals to the first to $N^{th}$ display panels, includes first to $N^{th}$ relays parts, wherein the $m^{th}$ (m is an integer satisfying $1 \leq m \leq N-1$) relay part outputs the $m^{th}$ video signal to the $m^{th}$ display panel and outputs the $(m+1)^{th}$ to $N^{th}$ video signals to the $(m+1)^{th}$ relay part.

In another aspect, a relay device included in a transmission part of a display system, which includes first to $N^{th}$ (N is an integer greater than or equal to 2) display panels, a drive part configured to output first to $N^{th}$ video signals of a video to be respectively displayed on the first to $N^{th}$ display panels and first to $N^{th}$ control signals for respectively controlling the first to $N^{th}$ display panels, and the transmission part configured to transmit the first to $N^{th}$ video signals and the first to $N^{th}$ control signals to the first to $N^{th}$ display panels, outputs the $m^{th}$ (m is an integer satisfying $1 \leq m \leq N-1$) video signal to the $m^{th}$ display panel and outputs the $(m+1)^{th}$ to $N^{th}$ video signals to the $(m+1)^{th}$ relay part.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Reference will now be made in detail to embodiments of the present disclosure, examples of which are illustrated in the accompanying drawings. In the following description, when a detailed description of well-known functions or configurations related to this document is determined to unnecessarily obscure the gist of the embodiment of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following descriptions are selected only for convenience of writing the specification and may be thus different from those used in actual products.

EMBODIMENT

A display system according to an embodiment of the present disclosure will be described with reference to FIGS. 1 to 5.

Figure 1:
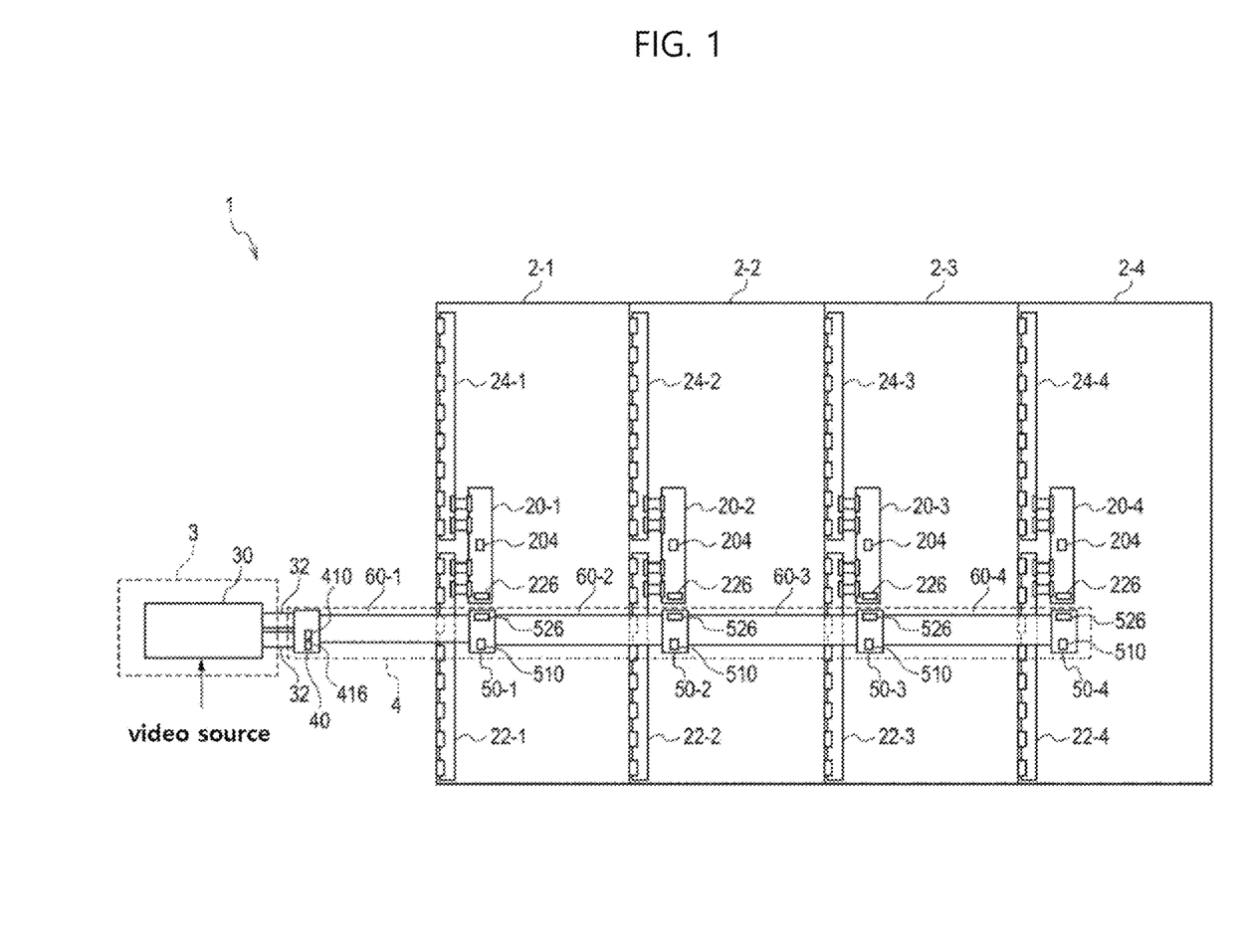
FIG. 1 is a schematic diagram showing an overall configuration of a display system according to an embodiment of the present disclosure.
Figure 2:
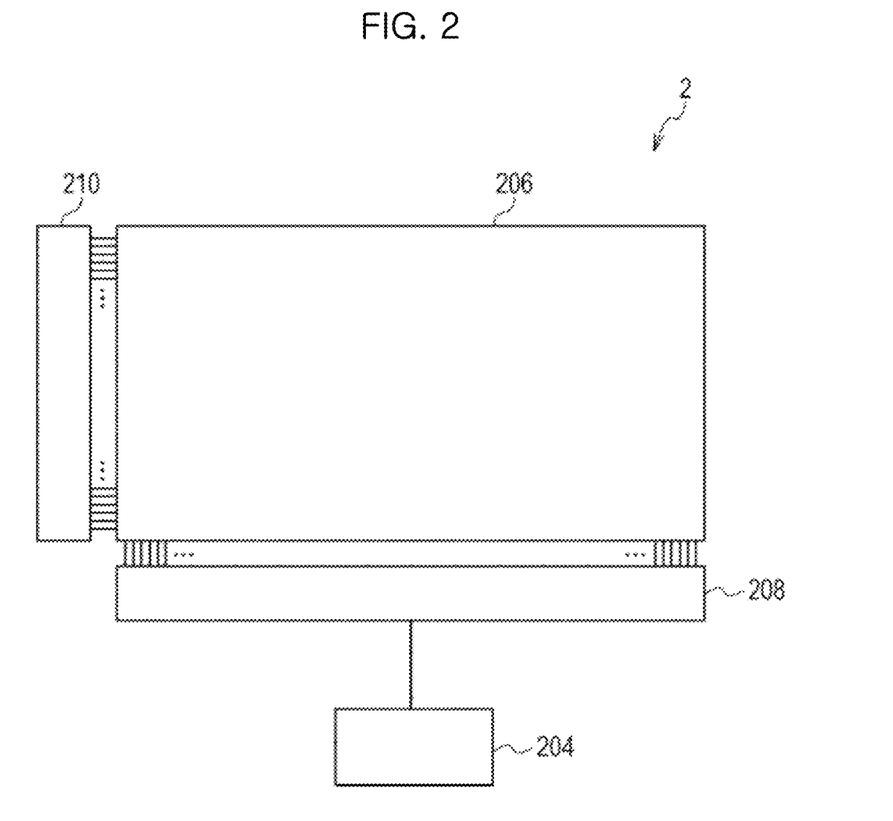
FIG. 2 is a schematic diagram showing a configuration of a display panel in the display system according to the embodiment of the present disclosure.

First, an overall configuration of the display system according to the embodiment will be described with reference to FIGS. 1 and 2. FIG. 1 is a schematic diagram showing the overall configuration of the display system according to the embodiment. FIG. 2 is a schematic diagram showing a configuration of a display panel in the display system according to the embodiment.

As shown in FIG. 1, a display system 1 according to the embodiment is a system which displays a video on a plurality of, that is, N (N is an integer greater than or equal to 2, and this is the same below), display panels 2-1, ..., and 2-N. Also, FIG. 1 shows the case of N=4.

The display system 1 according to the embodiment includes the display panels 2-1, ..., and 2-N, a drive device 3, and a transmission device 4. Each of the display panels 2-1, ..., and 2-N is a panel of, for example, an organic light-emitting diode (OLED) display, a liquid crystal display (LCD), a plasma display, or the like. The display panels 2-1, ..., and 2-N may be collectively referred to as the "display panel 2" below.

The N display panels 2-1, ..., and 2-N are the same kind of panel. In other words, the N display panels 2-1, ..., and 2-N have the same shape, the same size, and the same structure. The N display panels 2-1, ..., and 2-N are disposed, for example, in one horizontal row to constitute a single large screen. FIG. 1 shows a case in which four display panels 2-1, 2-2, 2-3, and 2-4 are disposed in one horizontal row, that is, the number of horizontally disposed display panels×the number of vertically disposed display panels of the display panel 2 is 4×1.

The number of display panels 2 is not limited to four, and two or more display panels 2 may be acceptable. Also, the number of horizontally disposed display panels×the number of vertically disposed display panels of the display panel 2 is not limited to 4×1, and x×y (x and y are positive integers independent of each other and satisfy x×y=N). In other words, the N display panels 2-1, ..., and 2-N may be disposed vertically rather than horizontally or may be disposed horizontally and vertically.

The N display panels 2-1, ..., and 2-N are not limited in their use and may be used as, for example, digital signage. The N display panels 2-1, ..., and 2-N may constitute large screen digital signage.

As shown in FIG. 2, the display panel 2 includes a timing controller 204, a panel 206, a source driver 208, and a gate driver 210. The gate driver 210 also includes a structure embedded in the panel 206. The panel 206 includes a plurality of pixels arranged in a matrix form and serves as a display which displays a video. Each pixel may include a plurality of sub-pixels such as red (R), green (G), and blue (B).

The timing controller 204 may be communicatively connected to the source driver 208, and the gate driver 210 is connected to the timing controller 204 through the panel 206. The timing controller 204 controls the operation of the source driver 208 and the gate driver 210 on the basis of an input control signal as described below. The control signal is, for example, a hot-plug detect signal of a V-by-One® signal, a lock detect signal, an inter-integrated circuit (I2C) signal (i.e., an inter-panel communication signal), a panel abnormality detection signal, or a signal related to panel image quality correction. Also, as will be described below, the timing controller 204 generates luminance data representing the luminance of each sub-pixel constituting a pixel in the panel 206 on the basis of an input video signal and outputs the luminance data to the source driver 208 as an output signal. A video signal includes timing signals such as a vertical synchronization signal, a horizontal synchronization signal, and a data enable signal.

The source driver 208 supplies a voltage for driving the plurality of pixels in the panel 206 through a plurality of data lines according to control of the timing controller 204. The gate driver 210 supplies a scan signal to the plurality of pixels in the panel 206 through a plurality of gate lines according to control of the timing controller 204. In this way, the timing controller 204 serves as a display control device which controls the operation of the overall display panel 2.

As shown in FIG. 1, a display panel 2-$i$ ($i$ is an integer satisfying $1 \leq i \leq N$, and this is the same below) includes a timing controller (T-CON) board 20-$i$, a drive board 22-$i$, and a drive board 24-$i$. A timing controller 204 is installed on the T-CON board 20-$i$. The drive boards 22-$i$ and 24-$i$ are boards on which the source driver 208 is installed.

The drive device 3 generates and outputs video signals of a video to be displayed on the display panels 2-1, ..., and 2-N and control signals for controlling the display panels 2-1, ..., and 2-N so as to display the video on the N display panels 2-1, ..., and 2-N according to a video source. In the display system 1 according to the embodiment, the N display panels 2-1, ..., and 2-N are controlled by the single drive device 3.

The video displayed on each of the display panels 2-1, ..., and 2-N is a partial video constituting a video displayed over, for example, the disposed display panels 2-1, ..., and 2-N. Also, videos displayed on the display panels 2-1, ..., and 2-N may be, for example, videos independent of each other.

The drive device 3 includes a drive board 30. The drive device 3 is configured as, for example, a set-top box. The drive board 30 generates and outputs video signals to be displayed on each of the display panels 2-1, ..., and 2-N according to an input video source. The drive board 30 generates control signals for controlling the display panels 2-1, ..., and 2-N and outputs the control signals in a time-division manner.

The video source input to the drive board 30 is not particularly limited and may be, for example, a broadcast signal of a television broadcast through ground waves, satellite waves, wires, or the like. Also, the video source may be, for example, recorded in a recording medium as a video file.

The transmission device 4 is a transmission part which transmits video signals and control signals output from the drive board 30 of the drive device 3 to the N display panels 2-1, ..., and 2-N. The transmission device 4 connects the single drive device 3 to the N display panels 2-1, ..., and 2-N. The transmission device 4 transmits control signals for controlling the N display panels 2-1, ..., and 2-N in a time-division manner as described below.

The transmission device 4 includes a signal integration board 40 and N relay boards 50-1, ..., and 50-N which are numbered the same as the N display panels 2-1, ..., and 2-N. The relay boards 50-1, ..., and 50-N are disposed to correspond to the display panels 2-1, ..., and 2-N on a one-to-one basis.

Also, the transmission device 4 includes a cable 60-1 which connects the signal integration board 40 to the relay board 50-1 and cables 60-2, ..., and 60-N which connect adjacent boards among the relay boards 50-1, ..., and 50-N. The relay boards 50-1, ..., and 50-N are the same kind of board. Also, the cables 60-1, ..., and 60-N are the same kind of cable.

The signal integration board 40 is an integration part which integrates and outputs video signals and control signals output from the drive device 3 so that the video signals and the control signals may be transmitted through the single cable 60-1 obtained by bundling a plurality of signal lines. The signal integration board 40 is connected to the drive board 30 of the drive device 3 through a cable 32. Functions of the signal integration board 40 may be included in the drive board 30 of the drive device 3. In other words, the signal integration board 40 may be integrally formed with the drive board 30.

The relay boards 50-1, ..., and 50-N are relay parts which relay the video signals and the control signals output from the signal integration board 40 and input the video signals and the control signals to the corresponding the display panels 2-1, ..., and 2-N, respectively. The relay boards 50-1, ..., and 50-N serve as relay devices which each relay and transmit the video signals and the control signals to the corresponding display panels 2-1, ..., and 2-N, respectively.

Figure 3:
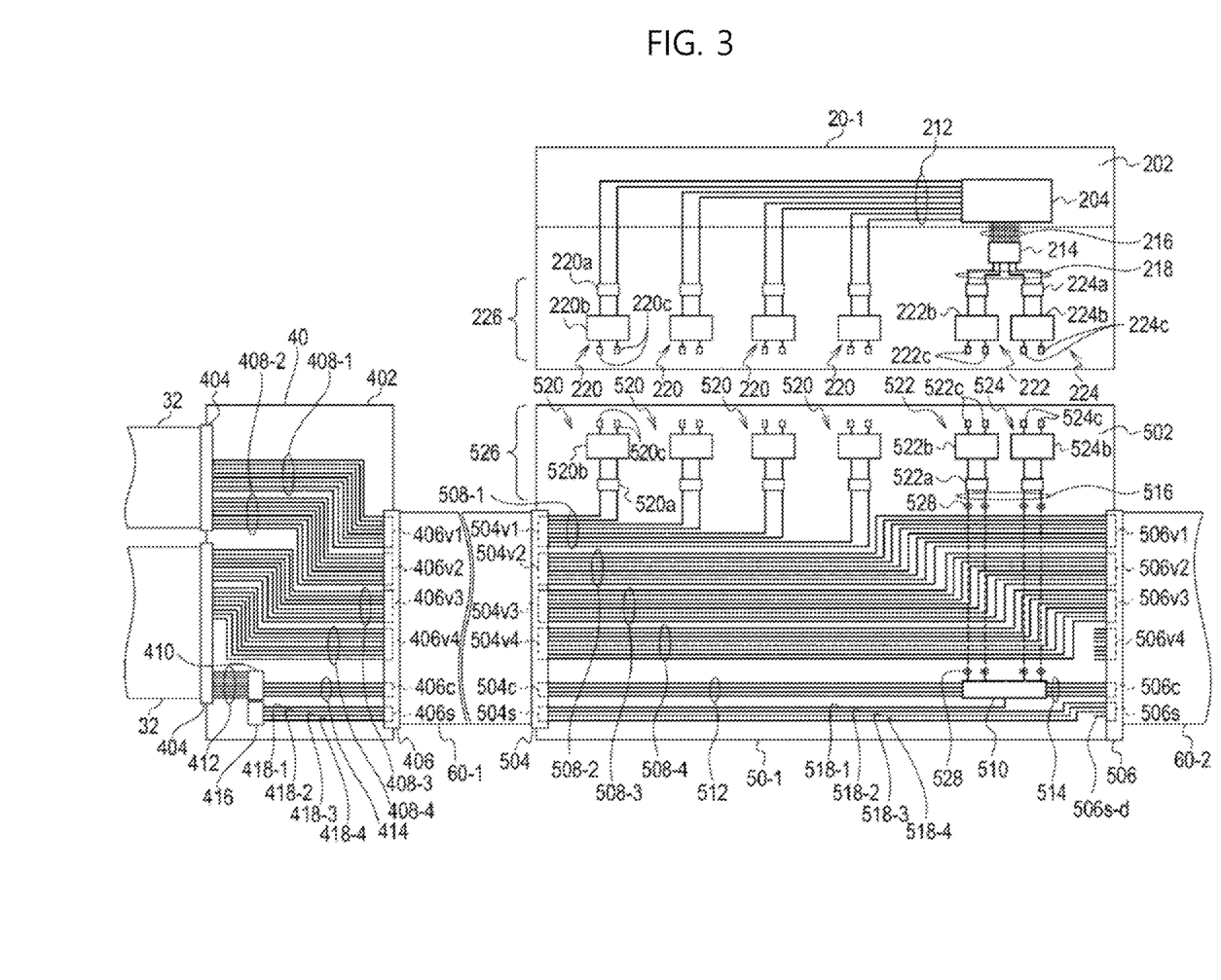
FIG. 3 is a schematic diagram of a signal integration board, a relay board, and a timing controller (T-CON) board in the display system according to the embodiment of the present disclosure.
Figure 4:
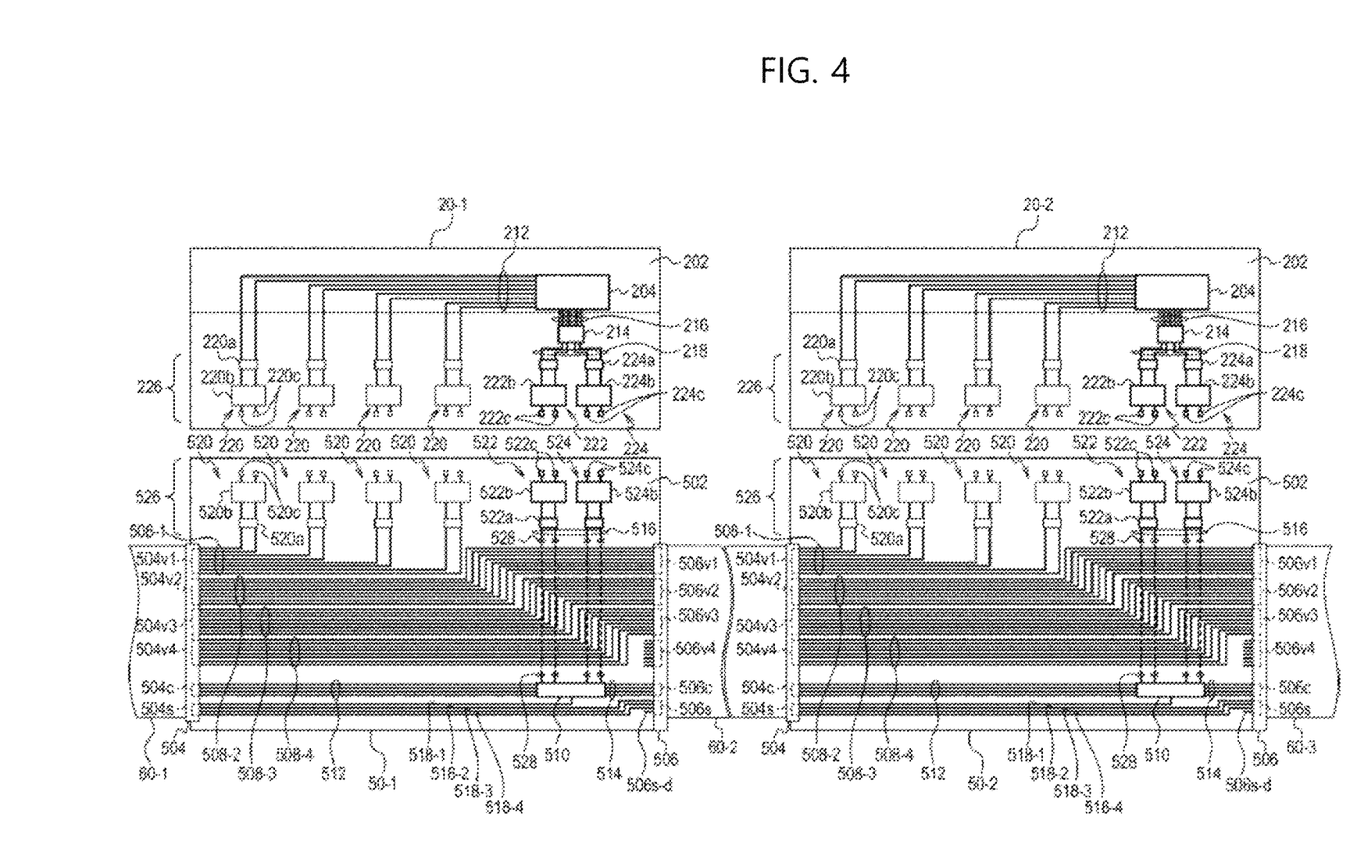
FIG. 4 is a schematic diagram of two adjacent relay boards in the display system according to the embodiment of the present disclosure.

A connection structure of the signal integration board 40, the relay boards 50-1, ..., and 50-N, and the T-CON boards 20-1, ..., and 20-N will be described in further detail below with reference to FIGS. 3 and 4. FIG. 3 is a schematic diagram of a signal integration board, a relay board, and a T-CON board in the display system according to the embodiment of the present disclosure. FIG. 4 is a schematic diagram of two adjacent relay boards in the display system according to the embodiment of the present disclosure.

FIG. 3 shows a connection structure of the signal integration board 40, the relay board 50-1, and the T-CON board 20-1. FIG. 3 shows the case of N=4.

As shown in FIG. 3, the signal integration board 40 includes a board body 402, an input connector 404, and an output connector 406. Also, the signal integration board 40 includes N video signal line groups 408-1, ..., and 408-N, a serializer/deserializer (SerDes) circuit 410, a control signal line group 412, a control signal line group 414, a control circuit 416, and N selection signal lines 418-1, ..., and 418-N.

The board body 402 has one end and the other end which are opposite to each other. The input connector 404 may be installed on the one end, and the output connector 406 may be installed on the other end. FIG. 3 shows a case in which two input connectors 404 are installed, but the number of input connectors 404 may be appropriately changed. On the board body 402, the SerDes circuit 410 and the control circuit 416 are installed.

The input connector 404 is configured as a cable-connectable connector. Also, the output connector 406 may be configured as a cable-connectable connector. On the output connector 406, output ports 406v1, ..., and 406vN are sequentially installed in parallel.

On the board body 402, the N video signal line groups 408-1, ..., and 408-N, the control signal line group 412, the control signal line group 414, and the N selection signal lines 418-1, ..., and 418-N are installed. The N video signal line groups 408-1, ..., and 408-N are installed between the input connector 404 and the output connector 406. The control signal line group 412 is installed between the input connector 404 and the SerDes circuit 410. The control signal line group 414 is installed between the SerDes circuit 410 and the output connector 406. The N selection signal lines 418-1, ..., and 418-N are installed between the control circuit 416 and the output connector 406.

Each of the video signal line groups 408-1, ..., and 408-N includes a plurality of lanes, each of which includes one set of two video signal lines for transmitting differential signals. FIG. 3 shows a case in which each of the video signal line groups 408-1, ..., and 408-N includes four lanes, that is, eight video signal lines, but the number of video signal lines and the number of lanes are not limited thereto. The number of video signal lines and the number of lanes may appropriately vary depending on a video signal to be transmitted and the like.

The control signal line group 412 includes a plurality of control signal lines through which bidirectional transmission of control signals is performed in parallel. The number of control signal lines included in the control signal line group 412 is, for example, eighteen.

The control signal line group 414 includes a plurality of control signal lines through which bidirectional transmission of control signals is performed in series. The control signal line group 414 includes two lanes, each of which includes one set of two control signal lines for transmitting differential signals, for performing bidirectional transmission. In other words, the number of control signal lines included in the control signal line group 414, for example, four, is smaller than the number of control signal lines included in the control signal line group 412 due to mutual switching of the SerDes circuit 410 between parallel transmission and serial transmission.

One-side ends of the N video signal line groups 408-1, ..., and 408-N is each connected to the input connector 404. The other-side ends of the N video signal line groups 408-1, ..., and 408-N are connected to the output ports 406v1, ..., and 406vN of the output connector 406, respectively.

One-side ends of the control signal line group 412 are connected to the input connector 404. The other-side ends of the control signal line group 412 are connected to the SerDes circuit 410.

One-side ends of the control signal line group 414 are connected to the SerDes circuit 410. The other-side ends of the control signal line group 414 are connected to an output port 406c of the output connector 406.

One-side ends of the N selection signal lines 418-1, ..., and 418-N is each connected to the control circuit 416. The other-side ends of the N selection signal lines 418-1, ..., and 418-N are each connected to an output port 406s of the output connector 406.

The SerDes circuit 410 is an integrated circuit (IC) which performs mutual switching between parallel transmission and serial transmission of control signals. The SerDes circuit 410 and a SerDes circuit 214, which is installed in each of the T-CON boards 20-1, ..., and 20-N and will be described below, may transmit control signals to each other through bidirectional SerDes. In control signal transmission, the SerDes circuit 410 is set as a master, and the SerDes circuit 214 is set as a slave. The SerDes circuit 410 performs mutual conversion between control signals transmitted in the control signal line group 412 in parallel and control signals transmitted in the control signal line group 414 in series.

The control circuit 416 is an IC which generates and outputs selection signals for sequentially selecting the N display panels 2-1, ..., and 2-N to which control signal transmission is performed. The control circuit 416 is configured with a field-programmable gate array (FPGA). The control circuit 416 generates and outputs a first selection signal for selecting the display panel 2-1, ..., and an $N^{th}$ selection signal for selecting the display panel 2-N to the selection signal lines 418-1, ..., and 418-N, respectively.

As described above, the input connector 404 to which each of the signal lines is connected is configured to connect each of the one-side ends of the N video signal line groups 408-1, ..., and 408-N and the control signal line group 412 to an external device. The cable 32 which is connected to the drive board 30 of the drive device 3 is connected from the outside to the input connector 404. The cable 32 is a bundle of signal lines through which video signals are transmitted from the drive device 3 and signal lines through which control signals are transmitted from the drive device 3. The video signals and the control signals are input to the signal integration board 40 from the drive device 3 through the cable 32.

Also, as described above, the output connector 406 to which each of the signal lines is connected is configured to connect the other-side ends of the N video signal line groups 408-1, ..., and 408-N, the control signal line group 414, and the N selection signal lines 418-1, ..., and 418-N to an external device.

To the video signal line groups 408-1, ..., and 408-N, the video signals of videos to be displayed on the display panels 2-1, ..., and 2-N are input from the drive device 3 through the cable 32. The control signals are input to the control signal line groups 412 from the drive device 3 through the cable 32.

The video signal line groups 408-1, ..., and 408-N transmit and output the video signals to the output ports 406v1, ..., and 406vN, respectively.

The control signal line group 412 transmits the control signals in parallel. The SerDes circuit 410 serializes the control signals, which are transmitted in parallel through the control signal line group 412, and outputs the control signals to the control signal line group 414. The control signal line group 414 transmits and outputs the control signals in parallel to the output port 406c.

Each of the N selection signal lines 418-1, ..., and 418-N transmits and outputs the selection signal input from the control circuit 416 to the output port 406s. The N selection signal lines 418-1, ..., and 418-N transmit the first selection signal for selecting the display panel 2-1, ..., and the $N^{th}$ selection signal for selecting the display panel 2-N, respectively.

The signal integration board 40 is configured as described above. The relay board 50-1 is connected to the signal integration board 40 through the cable 60-1.

The relay board 50-1 connected to the signal integration board 40 includes a board body 502, an input connector 504, and an output connector 506. Also, the relay board 50-1 includes N video signal line groups 508-1, ..., and 508-N, a selector circuit 510, a control signal line group 512, a control signal line group 514, a control signal line group 516, and N selection signal lines 518-1, ..., and 518-N. Further, the relay board 50-1 includes transmitters 520, a receiver 522, and a transmitter 524. The other relay boards 50-2, ..., and 50-N also have the same configuration.

The board body 502 has one end and the other end which are opposite to each other. The input connector 504 is installed on the one end, and the output connector 506 is installed on the other end. On the board body 502, the selector circuit 510, the transmitter 520, the receiver 522, and the transmitter 524 are installed. The transmitters 520, the receiver 522, and the transmitter 524 constitute a transmitter/receiver 526 which performs signal transmission and reception with the T-CON board 20-1 in the display panel 2-1.

The input connector 504 is configured as a cable-connectable connector. On the input connector 504, input ports 504v1, ..., and 504vN are sequentially installed in parallel.

Also, the output connector 506 may be configured as a cable-connectable connector. In the output connector 506, output ports 506v1, ..., and 506vN are sequentially installed in parallel.

On the board body 502, the N video signal line groups 508-1, ..., and 508-N, the control signal line group 512, the control signal line group 514, the control signal line group 516, and the N selection signal lines 518-1, ..., and 518-N are installed. Among the N video signal line groups 508-1, ..., and 508-N, the video signal line group 508-1 is installed between the input connector 504 and the transmitters 520. The other video signal line groups 508-2, ..., and 508-N are installed between the input connector 504 and the output connector 506. The control signal line group 512 is installed between the input connector 504 and the selector circuit 510. The control signal line group 514 is installed between the selector circuit 510 and the output connector 506. The control signal line group 516 is installed between the selector circuit 510 and the receiver 522 and the transmitter 524. Among the N selection signal lines 518-1, ..., and 518-N, the selection signal line 518-1 is installed between the input connector 504 and the selector circuit 510. The other selection signal lines 518-2, ..., and 518-N are installed between the input connector 504 and the output connector 506.

The N video signal line groups 508-1, ..., and 508-N, the selector circuit 510, the control signal line group 512, the control signal line group 514, the N selection signal lines 518-1, ..., and 518-N, the transmitters 520, the receiver 522, and the transmitter 524 are installed on one surface of the board body 502. Meanwhile, the control signal line group 516 has both end portions installed on the one surface of the board body 502 and the remaining portion installed on the other surface of the board body 502 through vias 528. On the other surface of the board body 502, the control signal line group 516 intersect the video signal line groups 508-2, ..., and 508-N installed on the one surface of the board body 502.

Each of the video signal line groups 508-1, . . . , and 508-N includes a plurality of lanes, each of which includes one set of two video signal lines for transmitting differential signals. FIG. 3 shows a case in which each of the video signal line groups 508-1, . . . , and 508-4 includes four lanes, that is, eight video signal lines, but the number of video signal line and the number of lanes are not limited thereto. The number of video signal lines and the number of lanes may appropriately vary depending on a video signal to be transmitted and the like.

Each of the control signal line groups 512, 514, and 516 includes a plurality of control signal lines through which bidirectional transmission of control signals is performed in series. Each of the control signal line groups 512, 514, and 516 includes two lanes, each of which includes one set of two control signal lines for transmitting differential signals, that is, four control signal lines, for performing bidirectional transmission.

Among the N video signal line groups 508-1, . . . , and 508-N, one-side end of the video signal line group 508-1 is connected to the input port 504v1 of the input connector 504. At the other end portion of the video signal line group 508-1, two video signal lines of each lane are connected to the transmitter 520.

The transmitter 520 transmits a video signal, which is transmitted as differential signals through two video signal lines of one lane in the video signal line group 508-1, to the T-CON board 20-1 of the display panel 2-1. The transmitter 520 includes a transmitter circuit 520a and a transmission device 520b. The transmitter circuit 520a is configured with an IC. Two video signal lines of each lane in the video signal line group 508-1 are connected to an input terminal of the transmitter circuit 520a. One terminal of the transmission device 520b is connected to an output terminal of the transmitter circuit 520a. The transmission device 520b allows noncontact signal transmission with a transmission device 220b which will be described below. As the transmission device 520b, a well-known device, such as an antenna, may be used. A termination resistor 520c is connected to the other terminal of the transmission device 520b as necessary so that the transmission device 520b ends with the termination resistor 520c. A circuit configuration of the transmitter 520 including the transmitter circuit 520a and the termination resistor 520c may appropriately vary depending on characteristics of the transmission device 520b and the like.

Among the N video signal line groups 508-1, . . . , and 508-N, one-side ends of the other video signal line groups 508-2, . . . , and 508-N are connected to the input ports 504v2, . . . , and 504vN, respectively. The other-side ends of the other video signal line groups 508-2, . . . , and 508-N are connected to the output ports 506v1, . . . , and 506v(N−1) of the output connector 506, respectively. The output port 506vN of the output connector 506 is a dummy port to which no video signal line is connected.

As such, the input ports 504v2, . . . , and 504vN are connected to the output ports 506v1, . . . , and 506v(N−1) through the video signal line groups 508-2, . . . , and 508-N, respectively.

A one-side end of the control signal line group 512 is connected to an input port 504c of the input connector 504. The other-side end of the control signal line group 512 is connected to the selector circuit 510.

A one-side end of the control signal line group 514 is connected to the selector circuit 510. The other-side end of the control signal line group 514 is connected to an output port 506c.

A one-side end of the control signal line group 516 is connected to the selector circuit 510. The other-side end of the control signal line group 516 is connected to the receiver 522 and the transmitter 524.

The receiver 522 receives a control signal which is transmitted from the T-CON board 20-1 as differential signals. The receiver 522 includes a receiver circuit 522a and a transmission device 522b. The receiver circuit 522a is configured with an IC. Two control signal lines of each lane in the control signal line group 516 are connected to an output terminal of the receiver circuit 522a. One terminal of the transmission device 522b is connected to an input terminal of the receiver circuit 522a. The transmission device 522b allows noncontact signal transmission with a transmission device 222b which will be described below. As the transmission device 522b, a well-known device, such as an antenna, may be used. A termination resistor 522c is connected to the other terminal of the transmission device 522b as necessary so that the transmission device 522b ends with the termination resistor 522c. A circuit configuration of the receiver 522 including the receiver circuit 522a and the termination resistor 522c may appropriately vary depending on characteristics of the transmission device 522b and the like.

The transmitter 524 transmits a control signal, which is transmitted as differential signals through two control signal lines of one lane in the control signal line group 516, to the T-CON board 20-1 of the display panel 2-1. The transmitter 524 includes a transmission device 524b. The two control signal lines of the one lane in the control signal line group 516 are connected to one terminal of the transmission device 524b. A termination resistor 524c is connected to the other terminal of the transmission device 524b so that the transmission device 524b ends with the termination resistor 524c. The transmission device 524b allows noncontact signal transmission with a transmission device 224b which will be described below. As the transmission device 524b, a well-known device, such as an antenna, may be used. The termination resistor 524c is connected to the other terminal of the transmission device 524b as necessary so that the transmission device 524b ends with the termination resistor 524c. A circuit configuration of the transmitter 524 including the termination resistor 524c may appropriately vary depending on characteristics of the transmission device 524b and the like.

One-side ends of the N selection signal lines 518-1, . . . , and 518-N are each connected to an input port 504s of the input connector 504. Among the N selection signal lines 518-1, . . . , and 518-N, the other-side end of the selection signal line 518-1 is connected to the selector circuit 510. The other-side ends of the other selection signal lines 518-2, . . . , and 518-N are each connected to an output port 506s of the output connector 506. In the output port 506s, a dummy terminal 506s-d to which the selection signal lines 518-2, . . . , and 518-N are not connected is installed.

The selector circuit 510 is an IC which connects the control signal line group 512 to the control signal line group 516 or the control signal line group 514 so that control signals may be transmitted and received. The selector circuit 510 connects the control signal line group 512 to the control signal line group 516 or the control signal line group 514 according to whether a selection signal is input from the selection signal line 518-1.

When a selection signal is input from the selection signal line 518-1, the selector circuit 510 connects the control signal line group 512 to the control signal line group 516 to which the receiver 522 and the transmitter 524 are connected. In this case, control signals may be transmitted and received between the relay board 50-1 and the T-CON board 20-1.

Meanwhile, when a selection signal is not input from the selection signal line 518-1, the selector circuit 510 connects the control signal line group 512 to the control signal line group 514 connected to the output port 506c. In this case, control signals flow between the relay board 50-1 and the relay board 50-2 which are adjacent to each other.

In this way, the selector circuit 510 serves as a selector which selectively outputs a control signal for controlling the display panel 2-1 to the display panel 2-1 according to a selection signal input from the selection signal line 518-1.

As described above, the input connector 504 to which each of the signal lines is connected is configured to connect each of the one-side ends of the N video signal line groups 508-1, ..., and 508-N, the control signal line group 512, and the N selection signal lines 518-1, ..., and 518-N to an external device.

Also, as described above, the output connector 506 to which each of the signal lines is connected is configured to connect each of the other-side ends of the N−1 video signal line groups 508-2, ..., and 508-N, the control signal line group 514, and the N−1 selection signal lines 518-2, ..., and 518-N to an external device.

The relay board 50-1 is configured as such. The relay board 50-1 is connected to the signal integration board 40 through the cable 60-1.

The other relay boards 50-2, ..., and 50-N also have the same structure as the above-described relay board 50-1. In other words, the relay boards 50-1, ..., and 50-N have identical and interchangeable structures rather than different structures.

The input connector 504 in the relay board 50-1 is connected to the output connector 406 in the signal integration board 40 through the cable 60-1.

The cable 60-1 is one bundle of signal line groups which connect the output connector 406 in the signal integration board 40 and the input connector 504 in the relay board 50-1. Specifically, the cable 60-1 is obtained by binding signal line groups which respectively connect the output ports 406v1, ..., 406vN, 406c, and 406s of the output connector 406 in the signal integration board 40 and the input ports 504-1, ..., 504-N, 504c, and 504s of the input connector 504 in the relay board 50-1 to each other.

Through the cable 60-1, the video signal line groups 408-1, ..., and 408-N of the signal integration board 40 are connected to the video signal line groups 508-1, ..., and 508-N of the relay board 50-1, respectively.

Also, through the cable 60-1, the control signal line group 414 of the signal integration board 40 is connected to the control signal line group 512 of the relay board 50-1.

Further, through the cable 60-1, the N selection signal lines 418-1, ..., and 418-N of the signal integration board 40 are connected to the N selection signal lines 518-1, ..., and 518-N of the relay board 50-1, respectively.

The N relay boards 50-1, ..., and 50-N are serially connected in order in one row through the cables 60-2, ..., and 60-N to correspond to the N display panels 2-1, ..., and 2-N which are disposed, for example, in one horizontal row. The adjacent relay boards 50-m and 50-(m+1) are connected through the cable 60-(m+1). Here, m is an integer satisfying 1≤m≤N−1 (this is the same below).

As an example of a connection structure of the two adjacent relay boards 50-m and 50-(m+1), FIG. 4 shows a connection structure of the relay board 50-1 and the relay board 50-2 in the case of m=1. Like FIGS. 1 and 3, FIG. 4 shows the case of N=4.

As shown in FIG. 4, the output connector 506 in the relay board 50-m is connected to the input connector 504 in the relay board 50-(m+1) through the cable 60-(m+1).

The cable 60-(m+1) is one bundle of signal line groups which connect the output connector 506 in the relay board 50-m and the input connector 504 in the relay board 50-(m+1). Specifically, the cable 60-(m+1) is obtained by binding signal line groups, which respectively connect the output ports 506v1, ..., 506vN, 506c, and 506s of the output connector 506 in the relay board 50-m and the input ports 504-1, ..., 504-N, 504c, and 504s of the input connector 504 in the relay board 50-(m+1) to each other.

Through the cable 60-(m+1), the video signal line groups 508-2, ..., and 508-N of the relay board 50-m are connected to the video signal line groups 508-1, ..., and 508-(N−1) of the relay board 50-(m+1), respectively. The video signal line group 508-N of the relay board 50-(m+1) is connected to the output port 506vN, which is a dummy port, of the output connector 506 in the relay board 50-m through the cable 60-(m+1). Accordingly, the video signal line group 508-N of the relay board 50-(m+1) is not connected to a video signal line group of the relay board 50-m.

Also, through the cable 60-(m+1), the control signal line group 512 of the relay board 50-m is connected to the control signal line group 512 of the relay board 50-(m+1).

Further, through the cable 60-(m+1), the N−1 selection signal lines 518-2, ..., and 518-N of the relay board 50-m are connected to the N−1 selection signal lines 518-1, ..., and 518-(N−1) of the relay board 50-(m+1). The selection signal line 518-N of the relay board 50-(m+1) is connected to the dummy terminal 506s-d, which is installed in the output port 506s of the output connector 506 in the relay board 50-m, through the cable 60-(m+1). Accordingly, the selection signal line 518-N of the relay board 50-(m+1) is not connected to a selection signal line of the relay board 50-m.

In this way, the output connector 506 in the relay board 50-m is connected to the input connector 504 in the relay board 50-(m+1) through the cable 60-(m+1).

The N relay boards 50-1, ..., and 50-N are connected to the T-CON boards 20-1, ..., and 20-N of the N display panels 2-1, ..., and 2-N, respectively. The relay boards 50-1, ..., and 50-N are connected to the T-CON boards 20-1, ..., and 20-N through connectors or the like, respectively. When the relay boards 50-1, ..., and 50-N are respectively connected to the T-CON boards 20-1, ..., and 20-N, the transmitters/receivers 526 of the relay boards 50-1, ..., and 50-N are respectively disposed to be spaced apart from receivers/transmitters 226 of the T-CON boards 20-1, ..., and 20-N, which will be described below, to face the receivers/transmitters 226. Noncontact signal transmission/reception is performed between the transmitter/receiver 526 and the receiver/transmitter 226 corresponding to each other.

As shown in FIGS. 3 and 4, the T-CON board 20-1 connected to the relay board 50-1 includes a board body 202, the above-described timing controller 204, and one video signal line group 212. Also, the T-CON board 20-1 includes the SerDes circuit 214, a control signal line group 216, and a control signal line group 218. Further, the T-CON board 20-1 includes receivers 220, a transmitter 222, and a receiver 224. The other T-CON boards 20-2, ..., and 20-N also have the same configuration.

On the board body 202, the timing controller 204, the SerDes circuit 214, the receivers 220, the transmitter 222, and the receiver 224 are installed. The receivers 220, the transmitter 222, and the receiver 224 constitute the receiver/transmitter 226 which performs signal reception and transmission with the relay board 50-1.

Also, on the board body 202, the one video signal line group 212, the control signal line group 216, and the control signal line group 218 are installed. The video signal line group 212 is installed between the timing controller 204 and the receivers 220. The control signal line group 216 is installed between the timing controller 204 and the SerDes circuit 214. The control signal line group 218 is installed between the SerDes circuit 214 and the transmitter 222 and the receiver 224.

The video signal line group 212 includes a plurality of lanes, each of which includes one set of two video signal lines for transmitting differential signals. FIGS. 3 and 4 show a case in which the video signal line group 212 includes four lanes, that is, eight video signal lines, but the number of video signal lines and the number of lanes are not limited thereto. The number of video signal lines and the number of lanes may appropriately vary depending on a video signal to be transmitted and the like.

The control signal line group 216 includes a plurality of control signal lines through which bidirectional transmission of control signals is performed in parallel. The number of control signal lines included in the control signal line group 216 is, for example, eighteen.

The control signal line group 218 includes a plurality of control signal lines through which bidirectional transmission of control signals is performed in series. The control signal line group 218 includes two lanes, each of which includes one set of two control signal lines for transmitting differential signals, that is, four control signal lines, for performing bidirectional transmission. The number of control signal lines included in the control signal line group 218, for example, four, is smaller than the number of control signal lines included in the control signal line group 216 due to mutual switching of the SerDes circuit 214 between parallel transmission and serial transmission.

A one-side end of the video signal line group 212 is connected to the timing controller 204. At the other end portion of the video signal line group 212, two video signal lines of each lane are connected to the receiver 220.

The receiver 220 receives a video signal which is transmitted from the transmitter 520 of the relay board 50-1 as differential signals. The receiver 220 includes a receiver circuit 220a and a transmission device 220b. The receiver circuit 220a is configured with an IC. Two video signal lines of each lane in the video signal line group 212 are connected to an output terminal of the receiver circuit 220a. One terminal of the transmission device 220b is connected to an input terminal of the receiver circuit 220a. The transmission device 220b allows noncontact signal transmission with the above-described transmission device 520b. As the transmission device 220b, a well-known device, such as an antenna, may be used. A termination resistor 220c is connected to the other terminal of the transmission device 220b as necessary so that the transmission device 220b ends with the termination resistor 220c. A circuit configuration of the receiver 220 including the receiver circuit 220a and the termination resistor 220c may appropriately vary depending on characteristics of the transmission device 220b and the like.

A one-side end of the control signal line group 216 is connected to timing controller 204. The other-side end of the control signal line group 216 is connected to the SerDes circuit 214.

A one-side end of the control signal line group 218 is connected to the SerDes circuit 214. The other-side end of the control signal line group 218 is connected to the transmitter 222 and the receiver 224.

The transmitter 222 transmits a control signal, which is transmitted as differential signals through two control signal lines of one lane in the control signal line group 218, to the relay board 50-1. The transmitter 222 includes the transmission device 222b. The two control signal lines of the one lane in the control signal line group 218 are connected to one terminal of the transmission device 222b. The transmission device 222b allows noncontact signal transmission with the above-described transmission device 522b. As the transmission device 222b, a well-known device, such as an antenna, may be used. A termination resistor 222c is connected to the other terminal of the transmission device 222b as necessary so that the transmission device 222b ends with the termination resistor 222c. A circuit configuration of the transmitter 222 including the termination resistor 222c may appropriately vary depending on characteristics of the transmission device 222b and the like.

The receiver 224 receives a control signal transmitted from the relay board 50-1 as differential signals. The receiver 224 includes a receiver circuit 224a and the transmission device 224b. The receiver circuit 224a is configured with an IC. Two control signal lines of each lane in the control signal line group 218 are connected to an output terminal of the receiver circuit 224a. One terminal of the transmission device 224b is connected to an input terminal of the receiver circuit 224a. The transmission device 224b allows noncontact signal transmission with the above-described transmission device 524b. As the transmission device 224b, a well-known device, such as an antenna, may be used. A termination resistor 224c is connected as necessary to the other terminal of the transmission device 224b so that the transmission device 224b ends with the termination resistor 224c. A circuit configuration of the receiver 224 including the receiver circuit 224a and the termination resistor 224c may appropriately vary depending on characteristics of the transmission device 224b and the like.

The SerDes circuit 214 is an IC which performs mutual switching between parallel transmission and serial transmission of control signals. The SerDes circuit 214 and the above-described SerDes circuit 410 installed on the signal integration board 40 may transmit control signals to each other through bidirectional SerDes. The SerDes circuit 214 performs mutual conversion between control signals transmitted in the control signal line group 216 in parallel and control signals transmitted in the control signal line group 218 in series.

The T-CON board 20-1 is configured as such. The corresponding relay board 50-1 is connected to the T-CON board 20-1 through a connector or the like. The transmission devices 520b, 522b, and 524b of the relay board 50-1 are disposed a certain distance away from the transmission devices 220b, 222b, and 224b of the T-CON board 20-1, to which the relay board 50-1 is connected, to face the transmission devices 220b, 222b, and 224b. The certain distance between the devices is set to a distance at which noncontact signal transmission is possible.

The other T-CON boards 20-2, . . . , and 20-N have the same structure as the above-described T-CON board 20-1. Also, like the above-described T-CON board 20-1, the other T-CON boards 20-2, . . . , and 20-N are connected to the corresponding relay boards 50-2, . . . , and 50-N, respectively.

The display system 1 according to the embodiment is configured as described above.

Each of the transmitter circuit 520a, the receiver circuits 220a, 522a, and 224a, the selector circuit 510, and the SerDes circuits 410 and 214 is not particularly limited and may be configured with a well-known circuit.

In the display system 1 according to the embodiment, video signals of a video to be displayed on the display panels 2-1, . . . , and 2-N are respectively transmitted to the display panels 2-1, . . . , and 2-N as follows. The video signals to be displayed on the display panels 2-1, . . . , and 2-N are input from the drive board 30 of the drive device 3 to the signal integration board 40.

First, the video signal of the video to be displayed on the display panel 2-1 is input to the timing controller 204 of the display panel 2-1 through the video signal line group 408-1 of the signal integration board 40, the video signal line group 508-1 and the transmitters 520 of the relay board 50-1, and the receivers 220 and the video signal line group 212 of the T-CON board 20-1.

The video signal of the video to be displayed on the display panel 2-2 is input to the timing controller 204 of the display panel 2-2 through the video signal line group 408-2 of the signal integration board 40, the video signal line group 508-2 of the relay board 50-1, the video signal line group 508-1 and the transmitters 520 of the relay board 50-2, and the receivers 220 and the video signal line group 212 of the T-CON board 20-2.

The video signal of the video to be displayed on the display panel 2-3 is input to the timing controller 204 of the display panel 2-3 through the video signal line group 408-3 of the signal integration board 40, the video signal line group 508-3 of the relay board 50-1, the video signal line group 508-2 of the relay board 50-2, the video signal line group 508-1 and the transmitters 520 of the relay board 50-3, and the receivers 220 and the video signal line group 212 of the T-CON board 20-3.

The video signal of the video to be displayed on the display panel 2-4 is input to the timing controller 204 of the display panel 2-4 through the video signal line group 408-4 of the signal integration board 40, the video signal line group 508-4 of the relay board 50-1, the video signal line group 508-3 of the relay board 50-2, the video signal line group 508-2 of the relay board 50-3, the video signal line group 508-1 and the transmitters 520 of the relay board 50-4, and the receivers 220 and the video signal line group 212 of the T-CON board 20-4.

During transmission of the video signals, the video signals of the video to be displayed on the display panels 2-$i$, . . . , and 2-N are respectively input to the input ports 504$v$1, . . . , and 504$v$(N−($i$−1)) of the input connector 504 in the relay board 50-$i$.

In the relay board 50-$m$ having the output connector 506 connected to the relay board 50-($m$+1), the video signal of the video to be displayed on the display panel 2-$m$ is output to the display panel 2-$m$ through the video signal line group 508-1 and the transmitter 520. Also, in the relay board 50-$m$, the video signals to be displayed on the display panels 2-($m$+1), . . . , and 2-N are output to the relay board 50-($m$+1) through the video signal line groups 508-2, . . . , and 508-(N−(m−1)).

The video signal of the video to be displayed on the display panel 2-$i$ is input to the timing controller 204 of the display panel 2-$i$ through the video signal line group 408-$i$ of the signal integration board 40, the video signal line group 508-$i$ of the relay board 50-1, the video signal line group 508-($i$−1) of the relay board 50-2, the video signal line group 508-($i$−2) of the relay board 50-3, . . . , the video signal line group 508-1 and the transmitters 520 of the relay board 50-$i$, and the receivers 220 and the video signal line group 212 of the T-CON board 20-$i$.

In the embodiment, the input ports 504$v$2, . . . , 504$v$N among the input ports 504$v$1, . . . , 504$v$N of the input connector 504 are connected to the output ports 506$v$1, . . . , and 506$v$(N−1) among the output ports 506$v$1, . . . , and 506$v$N of the output connector 506 through the video signal line groups 508-2, . . . , and 508-N, respectively. Accordingly, in the embodiment, video signals can be transmitted to the display panels 2-1, . . . , and 2-N as described above through the relay boards 50-1, . . . , and 50-N having the same structure. In the embodiment, the relay boards 50-1, . . . , and 50-N have the same structure. Therefore, adjacent relay boards can be connected through the same cable, and additional installation of a display panel is facilitated. In addition, in the case of connecting a display panel and a relay board, it is unnecessary to consider a match therebetween.

As described above, according to the embodiment, it is possible to transmit video signals to the N display panels 2-1, . . . , and 2-N through a simple configuration.

Figure 5:
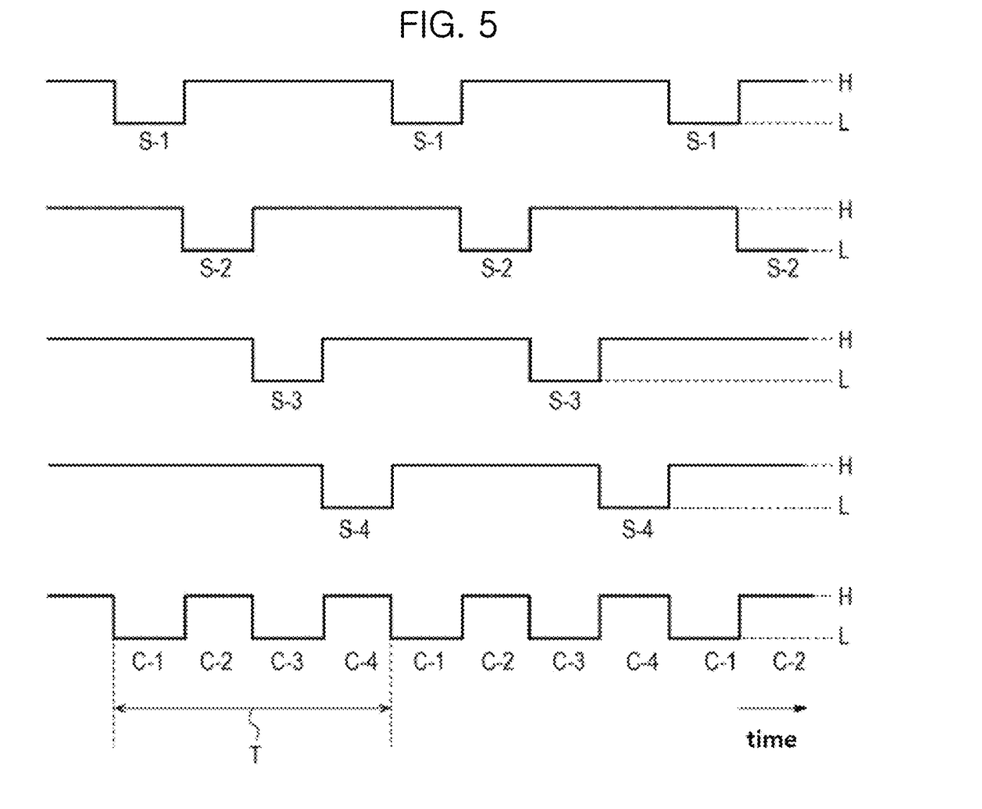
FIG. 5 is a timing diagram of control signals and selection signals in the display system according to the embodiment of the present disclosure.

Also, In the display system 1 according to the embodiment, control signals are transmitted between the drive board 30 and the display panels 2-1, . . . , and 2-N in a time-division manner. Transmission of control signals in the display system 1 according to the embodiment will be described below with reference to FIG. 5. FIG. 5 is a timing diagram of control signals and selection signals in time-division control signal transmission. FIG. 5 shows the case of N=4.

In FIG. 5, the first to fourth diagrams from the top show a selection signal S-1 for selecting the display panel 2-1, a selection signal S-2 for selecting the display panel 2-2, a selection signal S-3 for selecting the display panel 2-3, and a selection signal S-4 for selecting the display panel 2-4, respectively. Also, the diagram at the bottom shows one kind of control signals C-1, C-2, C-3, and C-4 which are transmitted in a time-division manner. Each of the selection signals S-1, S-2, S-3, and S-4 is an active-low signal which becomes active at the latter of a high level H and the low level L but may be an active-high signal according to specifications of an IC. For the control signals C-1, C-2, C-3, and C-4, for convenience, the control signals C-1 and C-3 are shown as low-level (L) signals, and the control signals C2 and C-4 are shown as high-level (H) signals.

As shown in FIG. 5, the drive board 30 of the drive device 3 multiplexes the control signals C-1, . . . , and C-N in a time-division manner and sequentially transmits the control signals C-1, . . . , and C-N. The control signals C-1, . . . , and C-N are intended to control the display panels 2-1, . . . , and 2-N, respectively. The drive board 30 periodically transmits the control signals C-1, . . . , and C-N to the N display panels 2-1, . . . , and 2-N at time intervals of a predetermined time T.

The control circuit 416 of the signal integration board 40 sequentially outputs the selection signals S-1, . . . , and S-N for selecting the display panels 2-1, . . . , and 2-N to the selection signal lines 418-1, . . . , and 418-N, respectively. The control circuit 416 outputs the selection signals S-1, . . . , and S-N in synchronization with the control signals C-1, . . . , and C-N, respectively.

The selection signal S-i is input to the selector circuit 510 of the relay board 50-$i$ through the selection signal line 418-$i$ of the signal integration board 40, the selection signal line 518-$i$ of the relay board 50-1, . . . , and the selection signal line 518-$i$ of the relay board 50-$i$.

When the display panel 2-$i$ is not selected because the selection signal S-i is not input, the selector circuit 510 of the relay board 50-$i$ connects the control signal line group 512 and the control signal line group 514. In this case, bidirectional transmission of control signals is not performed between the timing controller 204 of the T-CON board 20-$i$ and the drive board 30 of the drive device 3. Accordingly, control signals are output from the control signal line group 514 to the output port 506$c$ of the output connector 506.

Meanwhile, when the display panel 2-$i$ is selected because the selection signal S-i is input, the selector circuit 510 of the relay board 50-$i$ connects the control signal line group 512 and the control signal line group 516. In this case, bidirectional transmission of control signals is performed between the timing controller 204 of the T-CON board 20-$i$ and the drive board 30 of the drive device 3. Accordingly, the control signal C-i is output from the drive board 30 of the drive device 3 to the timing controller 204 of the T-CON board 20-$i$.

In this case, the control signal C-i is input to the relay board 50-$i$ through the control signal line group 412, the SerDes circuit 410, and the control signal line group 414 of the signal integration board 40, the control signal line groups 512 and 514 of the relay board 50-1, . . . , and the control signal line groups 512 and 514 of the relay board 50-($i$−1). Also, the control signal C-i is input to the timing controller 204 through the control signal line groups 512 and 516 and the transmitter 524 of the relay board 50-$i$ and the receiver 224, the SerDes circuit 214, and the control signal line group 216 of the T-CON board 20-$i$.

In this way, bidirectional transmission of control signals is performed between the timing controller 204 of each of the T-CON boards 20-1, . . . , and 20-N in the display panels 2-1, . . . , 2-N and the drive board 30 of the drive device 3.

In the embodiment, as described above, one-to-one transmission of control signals is performed between the drive board 30 and the timing controller 204 of the T-CON board 20-$i$ in a time-division manner. Accordingly, one-to-N transmission of control signals is performed between the drive board 30 and the N T-CON boards 20-1, . . . , and 20-N.

As for such control signal transmission based on time division, in the embodiment, control signals can be transmitted to the timing controllers 204 of the T-CON boards 20-1, . . . , and 20-N through a common control signal line group as described above. Accordingly, in the embodiment, it is possible to display a video on the plurality of panels 2-1, . . . , and 2-N while preventing an increase in the number of control signal lines.

According to the embodiment, the SerDes circuit 410 in the signal integration board 40 performs mutual switching between parallel transmission and serial transmission of control signals. Also, the SerDes circuit 214 in the T-CON board 20-$i$ performs mutual switching between parallel transmission and serial transmission of control signals. Accordingly, in the embodiment, it is possible to reduce the number of control signal lines.

As described above, according to the embodiment, it is possible to transmit control signals to the N display panels 2-1, . . . , and 2-N through a simple configuration.

The present disclosure is not limited to the embodiment and may be appropriately modified without departing from the scope of the present disclosure.

As an example, the case of transmitting signals in a non-contact manner between the relay boards 50-1, . . . , and 50-N and the T-CON boards 20-1, . . . , and 20-N, that is, between the transmission devices 520$b$ and 220$b$, between the transmission devices 222$b$ and 522$b$, and between the transmission devices 524$b$ and 224$b$, has been described above, but the present disclosure is not limited thereto. It is possible to employ a configuration for contact signal transmission through terminal pins, terminal patterns, etc. instead of non-contact signal transmission between transmission devices.

Also, a video signal transmission method and a control signal transmission method may be exchanged. The above-described control signal transmission method may be employed as a video signal transmission method, and the above-described video signal transmission method may be employed as a control signal transmission method.

As an example, the case of transmitting both video signals and control signals to the display panel 2-1, . . . , and 2-N through the relay boards 50-1, . . . , and 50-N has been described above, but the present disclosure is not limited thereto. As an example, video signals may be transmitted to the display panels 2-1, . . . , and 2-N through the relay boards 50-1, . . . , and 50-N as described above, whereas control signals may be transmitted to the display panels 2-1, . . . , and 2-N in another way. As another example, control signals may be transmitted to the display panels 2-1, . . . , and 2-N through the relay boards 50-1, . . . , and 50-N as described above, whereas video signals may be transmitted to the display panels 2-1, . . . , and 2-N in another way.

It will be apparent to those skilled in the art that various modifications and variations can be made in the display system, transmission device, and the relay device of the present disclosure without departing from the technical idea or scope of the disclosure. Thus, it is intended that the present disclosure cover the modifications and variations of this disclosure provided they come within the scope of the appended claims and their equivalents.

What is claimed is:
1. A display system, comprising:
first to $N^{th}$ display panels, N being an integer greater than or equal to 2;
a drive part configured to output:
 first to $N^{th}$ video signals of a video to be respectively displayed on the first to $N^{th}$ display panels; and
 first to $N^{th}$ control signals for respectively controlling the first to $N^{th}$ display panels; and
a transmission part configured to transmit the first to $N^{th}$ video signals and the first to $N^{th}$ control signals to the first to $N^{th}$ display panels,
wherein the transmission part comprises:
 a signal integration part configured to integrate and output:
  the first to $N^{th}$ video signals, and
  the first to $N^{th}$ control signals, and
 first to $N^{th}$ relay parts configured to relay and transmit the first to $N^{th}$ video signals and the first to $N^{th}$ control signals outputted from the signal integration part to the first to $N^{th}$ display panels, respectively,
wherein the signal integration part includes a first serializer/deserializer (SerDes) circuit configured to perform mutual conversion between the first to $N^{th}$ control signals transmitted with the drive part in parallel and the first to $N^{th}$ control signals transmitted with the first relay part in series, and wherein an mth relay part, m being an integer satisfying 1≤m≤N−1, is configured to:
  output an mth video signal to an mth display panel, and the output (m+1)[th] to N[th] video signals to an (m+1)[th] relay part.

2. The display system of claim 1, wherein the transmission part is further configured to transmit the first to N[th] control signals to the first to N[th] display panels in a time division manner.

3. The display system of claim 2, wherein the nth relay part further comprises a selector configured to selectively output the nth control signal to the nth display panel according to an input of an nth selection signal.

4. The display system of claim 3, wherein the nth relay part further comprises a second transmitter configured to transmit the nth control signal to the nth display panel.

5. The display system of claim 4, wherein the second transmitter of the nth relay part is configured to transmit the nth control signal to a second receiver in the nth display panel in a non-contact manner.

6. The display system of claim 3, wherein the mth relay part comprises:
  a selection signal line configured to input an mth selection signal to the selector; and
  other selection signal lines configured to output (m+1)[th] to N[th] selection signals to the (m+1)[th] relay part.

7. The display system of claim 1, wherein each of the first to N[th] video signals is a differential signal.

8. The display system of claim 1, wherein the first to N[th] display panels are a same kind of panel.

9. The display system of claim 8, wherein the first to N[th] display panels are disposed in a tile format.

10. The display system of claim 1, wherein the first to N[th] display panels are organic light-emitting diode (OLED) display panels.

11. The display system of claim 1, wherein:
  the first to N[th] control signals are transmitted:
    in parallel between the drive part and the first SerDes circuit through a plurality of first control signal lines; and
    in series between the first SerDes circuit and the first relay part through a plurality of second control signal lines; and
  a number of the plurality of second signal lines is smaller than a number of the plurality of first control signal lines.

12. A display system, comprising:
  first to N[th] display panels, N being an integer greater than or equal to 2;
  a drive part configured to output:
    first to N[th] video signals of a video to be respectively displayed on the first to N[th] display panels; and
    first to N[th] control signals for respectively controlling the first to N[th] display panels; and
  a transmission part configured to transmit the first to N[th] video signals and the first to N[th] control signals to the first to N[th] display panels,
  wherein the transmission part comprises first to N[th] relay parts,
  wherein an mth relay part, m being an integer satisfying 1≤m≤N−1, is configured to:
    output an mth video signal to an mth display panel, and output (m+1)[th] to N[th] video signals to an (m+1)[th] relay part, and
  wherein an nth relay part, n being an integer satisfying 1≤n≤N, comprises:
    first to N[th] input ports,
    first to N[th] output ports, and
    a first transmitter configured to transmit the nth video signal to the nth display panel,
  wherein the first input port is connected to the first transmitter,
  wherein the second to N[th] input ports are connected to the first to (N−1)[th] output ports, respectively,
  wherein the first to N[th] output ports of the mth relay part are connected to the first to N[th] input ports of the (m+1)[th] relay part, and
  wherein the first to N[th] video signals are input to the first to N[th] input ports of the first relay part, respectively.

13. The display system of claim 12, wherein the Nth output port is a dummy port.

14. The display system of claim 12, wherein the first transmitter of the nth relay part is configured to transmit the nth video signal to a first receiver in the nth display panel in a non-contact manner.

15. The display system of claim 12, wherein the transmission part includes an (m+1)[th] cable obtained by binding signal lines that connect the first to N[th] output ports of the mth relay part to the first to N[th] input ports of the (m+1)[th] relay part, respectively.

16. A transmission device in a display system, which includes first to N[th] display panels, N being an integer greater than or equal to 2, and a drive part configured to output first to N[th] video signals of a video to be respectively displayed on the first to N[th] display panels and first to N[th] control signals for respectively controlling the first to N[th] display panels, configured to transmit the first to N[th] video signals and the first to N[th] control signals to the first to N[th] display panels, wherein:
  the transmission device comprises:
    a signal integration part configured to integrate and output the first to N[th] video signals and the first to N[th] control signals; and
    first to N[th] relays parts configured to relay and transmit the first to N[th] video signals and the first to N[th] control signals, outputted from the signal integration part, to the first to N[th] display panels, respectively;
  the signal integration part includes a first serializer/deserializer (SerDes) circuit configured to perform mutual conversion between:
    the first to N[th] control signals transmitted with the drive part in parallel; and
    the first to N[th] control signals transmitted with the first relay part in series; and
  an mth relay part, m being an integer satisfying 1≤m≤N−1, is configured to:
    output an mth video signal to an mth display panel; and
    output (m+1)[th] to N[th] video signals to an (m+1)[th] relay part.

17. The transmission device of claim 16, wherein the first to N[th] control signals are transmitted to the first to N[th] display panels in a time division manner.

18. A transmission device in a display system, which includes first to N[th] display panels, N being an integer greater than or equal to 2, and a drive part configured to output first to N[th] video signals of a video to be respectively displayed on the first to N[th] display panels and first to N[th] control signals for respectively controlling the first to N[th] display panels, for transmitting the first to N[th] video signals and the first to N[th] control signals to the first to N[th] display panels, wherein:

the transmission device comprises first to $N^{th}$ relays parts;

an $m^{th}$ relay part, m being an integer satisfying $1 \leq m \leq N-1$, is configured to output an $m^{th}$ video signal to an $m^{th}$ display panel, and output $(m+1)^{th}$ to $N^{th}$ video signals to an $(m+1)^{th}$ relay part;

the $n^{th}$ relay part, n being an integer satisfying $1 \leq n \leq N$, comprises:
 first to $N^{th}$ input ports;
 first to $N^{th}$ output ports; and
 a first transmitter configured to transmit the $n^{th}$ video signal to the $n^{th}$ display panel;

the first input port is connected to the first transmitter;

the second to $N^{th}$ input ports are connected to the first to $(N-1)^{th}$ output ports, respectively;

the first to $N^{th}$ output ports of the $m^{th}$ relay part are connected to the first to $N^{th}$ input ports of the $(m+1)^{th}$ relay part; and the first to $N^{th}$ video signals are input to the first to $N^{th}$ input ports of the first relay part, respectively.

19. A relay device included in a transmission part of a display system, which includes first to $N^{th}$ display panels, N being an integer greater than or equal to 2, a drive part configured to output first to $N^{th}$ video signals of a video to be respectively displayed on the first to $N^{th}$ display panels and first to $N^{th}$ control signals for respectively controlling the first to $N^{th}$ display panels, wherein:

the transmission part is configured to transmit the first to $N^{th}$ video signals and the first to $N^{th}$ control signals to the first to $N^{th}$ display panels;

the relay device is configured to:
 transmit the first to $N^{th}$ control signals in series with a first serializer/deserializer (SerDes) circuit of the transmission part;
 transmit the first to $N^{th}$ control signals in series with a second SerDes circuit of each of the first to $N^{th}$ display panels;
 output an $m^{th}$ video signal to an $m^{th}$ display panel, m being an integer satisfying $1 \leq m \leq N-1$; and
 output $(m+1)^{th}$ to $N^{th}$ video signals to an $(m+1)^{th}$ relay device.

20. The relay device of claim 19, wherein the transmission part is further configured to transmit the first to $N^{th}$ control signals to the first to $N^{th}$ display panels in a time division manner.

21. A relay device included in a transmission part of a display system, which includes first to $N^{th}$ display panels, N being an integer greater than or equal to 2, a drive part configured to output first to $N^{th}$ video signals of a video to be respectively displayed on the first to $N^{th}$ display panels and first to $N^{th}$ control signals for respectively controlling the first to $N^{th}$ display panels, the transmission part configured to transmit the first to $N^{th}$ video signals and the first to $N^{th}$ control signals to the first to $N^{th}$ display panels, the relay device outputting the $m^{th}$ video signal, m being an integer satisfying $1 \leq m \leq N-1$ to the $m^{th}$ display panel and outputting the $(m+1)^{th}$ to $N^{th}$ video signals to an $(m+1)^{th}$ relay device, comprising:

first to $N^{th}$ input ports;
first to $N^{th}$ output ports; and
a first transmitter configured to transmit the $m^{th}$ video signal to the $m^{th}$ display panel,
wherein the first input port is connected to the first transmitter,
wherein the second to $N^{th}$ input ports are connected to the first to $(N-1)^{th}$ output ports, respectively, and
wherein the $m^{th}$ to $N^{th}$ video signals are input to the first to $(N-(m-1))^{th}$ input ports, respectively.

* * * * *